United States Patent Office 3,500,870
Patented Mar. 17, 1970

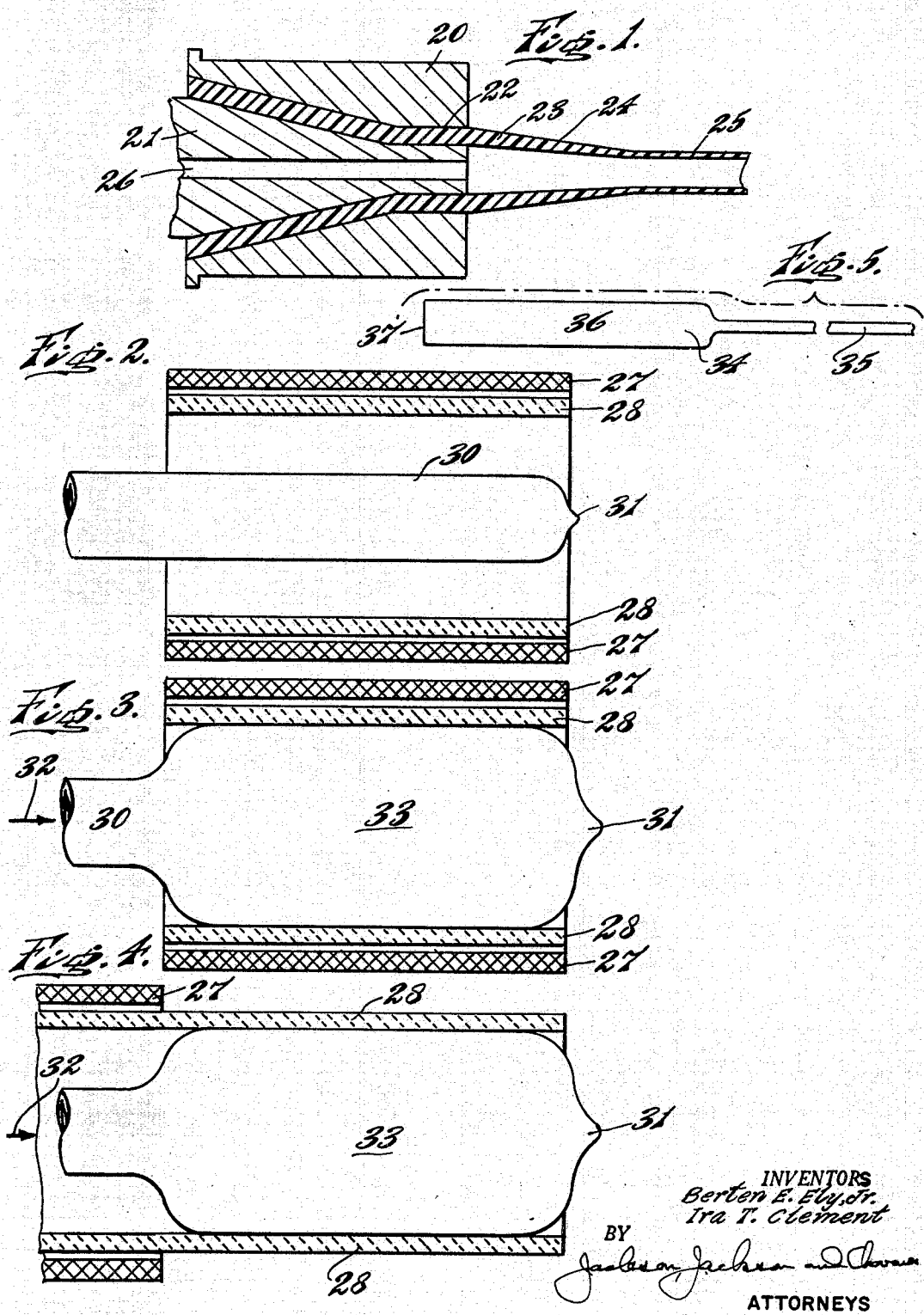

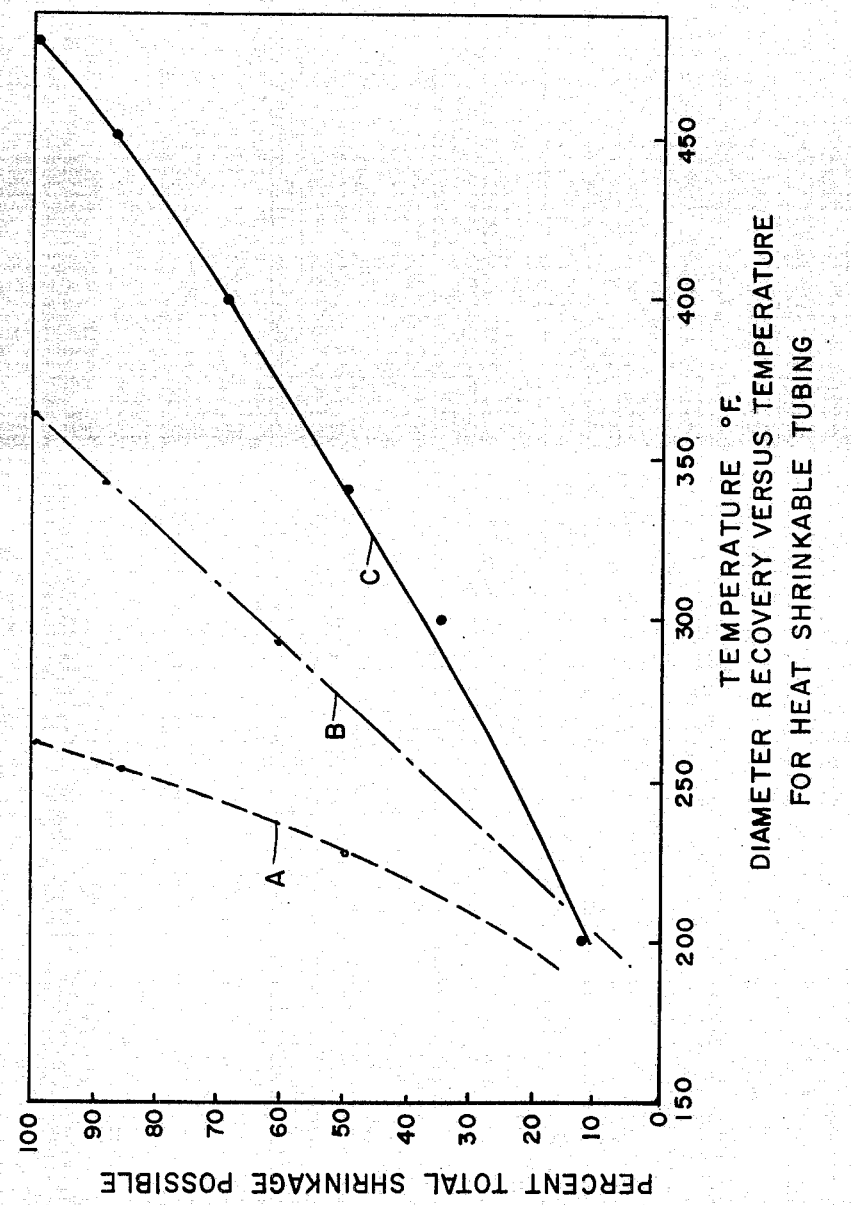

3,500,870
FEP 160 FLUOROCARBON TUBING AND PROCESS
Berten E. Ely, Jr., Cheyney, and Ira T. Clement, Glen Mills, Pa., assignors to Pennsylvania Fluorocarbon Company, Inc., Clifton Heights, Pa., a corporation of Pennsylvania
Filed May 2, 1967, Ser. No. 635,441
Int. Cl. F16l 9/14; B29c 17/04
U.S. Cl. 138—177                    4 Claims

ABSTRACT OF THE DISCLOSURE

The present invention relates to fluorocarbon tubing having unusually high ratios of expanded diameter to recovered diameter, which tubing possesses the properties of heat sealability, can be produced in long lengths, and can be produced in a wide variety of wall thicknesses. This result is obtained by using FEP 160 fluorocarbon which is a copolymer of tetrafluoroethylene and 5 to 50% by weight of hexafluoropropylene, preferably 5 to 15%, having a tensile strength between 4000 and 4500 p.s.i., and controlling the parameters so that unusually high ratios of expanded diameter to recovered diameter in the range of 2.05 to 2.50 and preferably 2.05 to 2.25 are obtained without bursting the tubing. It is necessary to expand against a surrounding restraining device.

DESCRIPTION OF THE INVENTION

The present invention relates to fluorocarbon tubing and processes of making it in high ratios of expanded diameter to recovered diameter.

A purpose of the invention is to produce fluorocarbon tubing having ratios of expanded diameter to recovered diameter in the range between 2.05 and 2.50, and preferably between 2.05 and 2.25, by expanding FEP 160 fluorocarbon produced and extruded under controlled conditions to engage a surrounding mandrel.

A further purpose is to provide fluorocarbon tubing of a character which is expanded and is capable of recovering, having a high ratio of expanded diameter to recovered diameter so as to grip firmly surfaces having a high degree of variation in diameter.

A further purpose is to obtain a firmer grip by recovered fluorocarbon tubing on engaging inner surfaces such as nipples and wiring.

A further purpose is to permit an expanded fluorocarbon tube to be threaded over terminal fittings at the end of a hose or a wiring harness, and then to shrink it so as to grip the outside of the hose or the wiring harness, thus permitting shrinking fluorocarbon tubing on hoses and wires after fittings and terminals have been installed.

A further purpose is to make fluorocarbon tubing more suitable for military electrical applications.

Further purposes appear in the specification and in the claims.

In the drawings we have chosen to illustrate one only of the numerous processes for producing heat shrinkable tubing according to the invention, choosing the forms shown from the standpoints of convenience in illustration, satisfactory operation and clear demonstration of the principles involved.

FIGURE 1 is a diagrammatic central vertical axial section of an extrusion die for extruding FEP 160 fluorocarbon tubing according to the invention.

FIGURE 2 is a diagrammatic axial section showing the heating of fluorocarbon tubing according to the invention for the purpose of expansion.

FIGURE 3 is a diagrammatic axial section showing the expansion of the tubing according to the invention, it being understood that the length of the tubing being expanded has been shown as far less than the length which ordinarily will be used, so as to simplify the drawings.

FIGURE 4 is a diagrammatic axial section showing the cooling of the expanded tubing according to the invention.

FIGURE 5 is a fragmentary diagrammatic side elevation showing in recovered diameter one character of service to which the expanded tubing of the invention will be applied.

FIGURE 6 is a curve useful in explaining the peculiarities of the tubing of the invention, the curve plotting percent total shrinkage possible as ordinate against temperature in ° F. as abscissa and thus illustrating diameter of recovery v. temperature for heat shrinkable tubing of various characters.

Describing in illustration but not in limitation and referring to the invention.

Tetrafluoroethylene can be produced in the form of heat shrinkable tubing. It can be expanded and cooled and it can be shrunk by reheating. This is described in Australian Patent 225,619, Canadian Patent 484,849 and U.S. Patent 2,983,961. There are certain limitations on the usefulness of tetrafluoroethylene expanded tubing, among the most important being that it is costly because it cannot be melt extruded and must be paste extruded, it cannot be heat sealed, it cannot be made in transparent form, and the temperature for shrinkage is so high that many materials over which it would desirably be shrunk are destroyed by subjecting to this temperature, examples being certain plastics and wood.

It would be very desirable to expand truly thermoplastic plastics which can be melt extruded, by heating tubing of such plastics and introducing gas under pressure to the heated tubing in the same manner in which tetrafluoroethylene can be expanded. These efforts have met with varying success ranging from complete failure to limited success in some cases.

In the case of monochlorotrifluoroethylene tubing (Kel–F) we have found that, when heating the tubing to expand it, the tubing simply bursts by blowing holes in it and no heat shrinkable tubing can be produced.

We also find that in attempting to make heat shrinkable tubing from polyvinylidene fluoride, from polycarbonate, from polyethylene and from polypropylene, the same type of failures occur and the tubing simply is destroyed by blowing holes in it.

It is known that heat shrinkable tubing can be made of polyolefin by irradiating the tubing so that it crosslinks. This tubing, however, has the disadvantage that it cannot be heat sealed. Furthermore, the irradiating adds greatly to the cost and time required to produce the heat shrinkable tubing.

In Patents 3,196,194 and 3,265,092 of Ely, Burley and Clement, tubing is described of FEP fluorocarbon (now called FEP 100 fluorocarbon) which is capable of recovery in ratios of expanded diameter to recovered diameter between 1.05 and 2.0. Prior efforts to make FEP fluorocarbon tubing having ratios of expanded diameter to recovered diameter in excess of 2.0 failed and the experiments resulted in blowing holes in the tubing.

The present inventors have discovered that by utilization of different material, and by controlling the manuafcturing techniques, it is possible to make FEP fluorocarbon tubing which has a ratio of expanded diameter to recovered diameter in the range of 2.05 and 2.50, preferably in the range of 2.05 to 2.25.

The material used in a copolymer of tetrafluoroethylene and 5 to 50% by weight of hexafluoropropylene, preferably 5 to 15%, which has some properties similar to that of FEP 100 fluorocarbon, the material described in U.S. Patents 3,196,194 and 3,265,092. The new material will be referred to herein as FEP 160 fluorocarbon. Like FEP 100 fluorocarbon it is not irradiated.

The tubing is capable of being heat sealed.

The heat shrinkage tubing can readily be made transparent.

The heat shrinkable tubing can withstand temperatures up to 480° F. for times long enough to expand it.

The tubing has the desirable fire resistance, chemical resistance and electrical insulation properties of FEP 100 fluorocarbon.

The tubing can be produced in indefinite lengths, easily 10 feet or longer.

The tubing of the invention can be produced in a range of wall thicknesses between 0.015 and 0.060 inch. Unlike FEP 100 fluorocarbon, however, the new FEP 160 tubing of the present invention is of higher molecular weight and has a much higher tensile strength, of the order of 4000 to 4500 p.s.i., where the tensile strength of FEP 100 fluorocarbon is about 2700 to 3300 p.s.i.

The tubing of the present invention also has much higher elongation, in the range of about 380 to 400%, whereas the elongation of FEP 100 fluorocarbon is about 340%.

The tubing of the present invention has a highly unusual property of starting to shrink at a lower temperature than FEP 100 and completing its shrinkage at a higher temperature than FEP 100, so that a considerable range of selection of shrinkage temperatures is possible as latex explained more fully.

The tubing of the invention notwithstanding its high shrinkage ratio gives very reliable shrinkage and is free from the unreliability or uncertainty of shrinkage which has been encountered in some prior art heat shrinkable tubing.

By the present invention we find that reliable ratios of expanded diameter to recovered diameter between 2.05 and 2.50, preferably between 2.05 and 2.25, can be obtained and very remarkably, the same temperature and the same pressure will produce any one of these ratios by simply using a mandrel of the desired size to limit the expansion.

Since there is no irradiation, the tubing of the invention is completely heat sealable.

Thus in summary, the tubing of the invention is heat shrinkable in a higher ratio range but has properties comparable to polytetrafluoroethylene and to FEP 100 fluorocarbon such as fire resistance, chemical resistance, high electrical insulation property, ability to withstand high temperatures, and transparency where desired. Unlike FEP 100 fluorocarbon expanded tubing, the tubing of the present invention when recovered has a firmer grip on an internal object such as wiring or a connector cable, and will more completely follow the contour of objects having wide variations in diameter.

We find that the minimum practical wall thickness for tubing of the invention is about 0.015 inch.

The invention can make indefinite lengths of tubing, for example of the order of 300 feet or more in a single piece. The FEP 160 tubing which is to be expanded according to the present invention must be melt extruded as defined below.

In FIGURE 1 we show a typical extrusion die for melt extruding FEP 160 fluorocarbon tubing. This shows a die 20 surrounding a mandrel 21. Between the die and the mandrel and extending out through an extrusion nozzle 22 are fused FEP 160 fluorocarbon plastic 23 extruded under a suitable pressure as from an extrusion screw not shown. Following current practice, the extruded tubing leaving the extrusion nozzle at 22 is drawn down at 24 to form the final FEP 160 fluorocarbon tubing 25. The mandrel 21 suitably has an opening 26 for blowing air through the tubing as well known in the art.

We find that in order to make FEP 160 fluorocarbon tubing which can be reliably expanded and expanded to a higher degree according to the invention, the practice for making FEP 100 expanded tubing must be modified. The front barrel temperature in the practice as carried out by us is approximately 580° to 600° F. and the rear barrel temperature is 560 to 580° F.

Also, in the practice as carried out by us the extrusion rate depending on extruder size and tube size is within the following ranges:

| Screw diameter in inches: | Extrusion rate in pounds per hour |
|---|---|
| 1 | 1.75–2 |
| 2 | 4.9–5.6 |
| 3 | 14–16 |

If the reduced temperature range and reduced extrusion rate be employed as set forth above, a marked benefit is obtained and FEP 160 fluorocarbon tubing is obtained which can be properly expanded at the temperature ranges set forth below to obtain the advantages already described.

In the general practice of melt extruding FEP 160 fluorocarbon the front barrel temperature is maintained at about 570° F. and the rear barrel temperature is obtained at about 560° F. regardless of the tubing size.

Also in the general practice of melt extruding, FEP 160 fluorocarbon, the extrusion rate for the size of extruded tubing in the table above is as follows:

| Screw diameter in inches: | Extrusion rate in pounds per hour |
|---|---|
| 1 | 2.5 |
| 2 | 7 |
| 3 | 20 |

Thus the throughput following the technique of the present invention is about 20% lower when making tubing of the present invention than when following the normal prior art practice in making FEP 160 fluorocarbon tubing.

In order to expand the FEP 160 fluorocarbon tubing in accordance with the invention, the tubing, after completion of the extrusion and cooling, is heated to a temperature of 250 to 400° F. and preferably 325 to 350° F. This can be accomplished in a suitable oven, by infrared heat, hot air heating or by heating in a hot liquid bath.

We show in FIGURE 2 a suitable electric heater or oven 27 conveniently of circular cross section, which may for example be an electric resistance heater, surrounding a mandrel or restraining device 28 which will conveniently be a glass tube because of the advantage of visibility, which in turn surrounds a tube 30 of FEP 160 fluorocarbon produced as above which is closed at one end 31 as by heat sealing, although it can equally well be closed by a plug or by pinching the tubing.

Once the tube 30 reaches the desired temperature for expansion within the ranges set forth above, it is subjected to gas, liquid or mechanical pressure, applied internally as indicated by the arrow 32. In the case of gas pressure, compressed air, nitrogen, carbon dioxide or the like may be used. The result is as shown in FIGURE 3 an expanded tube of larger diameter as shown at 33. The liquid can be oil or liquid metal. The pressure can be applied by mechanically expanding mandrels of well known construction.

It is very important that a surrounding mandrel or restraining device 28 be employed, because experience indicates in expanding FEP 160 tubing (unlike FEP 100) that once an adequate internal pressure is attained the tube will if not restrained by the mandrel expand so much that it will burst.

The gas pressure used is a function of the diameter of the tube to be expanded, the thickness of its wall and the temperature of the tube when it is expanded. Typical relations are as follows: In expanding FEP 160 fluorocarbon tubing having an initial diameter of 5/16 inch and a wall thickness of 0.020 inch at a temperature of 350° F. we find that an internal air pressure of 100 p.s.i. gives an expansion which depending on the mandrel internal diameter can be for example 2.25 times the original internal tubing diameter.

With FEP 160 fluorocarbon tubing having an internal diameter of ½ inch and a wall thickness of 0.025 inch at a temperature of 325° F. we find that air pressure of 50 p.s.i. will give expansions of the internal diameter to 2.25 times its initial diameter, depending on the mandrel size.

Once the expansion desired has been reached, it is important to cool the tube while it is expanded so that it will become heat shrinkable by retaining the memory of its small diameter. In FIGURE 4 we show a portion of the mandrel 28 which extends out beyond the heater into a cool area, so that the tube on advancing through the mandrel will achieve the increased diameter and hold it indefinitely.

It will be understood that, of course, if the tube is being progressed forward continuously while subjected to the internal pressure from the position shown in FIGURE 2 to the position shown in FIGURE 3 and then to the position shown in FIGURE 4, the expansion will be obtained progressively and long lengths of heat shrinkable tubing as shown in FIGURE 4 can be obtained, say several hundred feet long.

Unusual properties are possessed by FEP 160 fluorocarbon tubing illustrated in FIGURE 4. Depending on the extent of expansion it will give a correspondingly high degree of contraction when heated to temperatures in the range of 200 to 480° F. and preferably 250 to 400° F. for at least several minutes (10 minutes even at the highest temperature). No harm is done to the plastic as it can be held for considerable time at a temperature of 400° F.

FIGURE 5 shows a typical example of utilization of the invention. This shows a bulb 34 connected to a tube 35 of a sensing element for a temperature or pressure measuring device. Heat shrinkable tubing 36 of FEP 160 large enough to pass over the bulb was slipped over it and then heated to the proper temperature to provide shrinkage. Because of the ability to have a ratio of expanded diameter to recovered diameter in the range of 2.05 to 2.50 and preferably 2.05 to 2.25 which is an unusual feature of this tube, the tube 36 has shrunk so as to conform tightly to the bulb 34 and also tightly to the copolymer tubing 35 and has been heat sealed at 37 to close the end. This is an unusual capability of the tubing of the present invention.

It will be evident that the invention is especially valuable since it permits assembling of hoses with end connectors and of wiring harnesses with terminals, and inserting such hoses or wiring harnesses in the expanded tubing of the invention without obstruction from the end connectors or terminals and then contracting or shrinking so that the tubing of the invention firmly grips the outside of the hose or of the wire harness. Due to the fact that the gripping force of the tubing of the invention is unusually great, the tubing thus has a wide variety of capabilities for which other heat shrinkable tubing are not suitable. It should be kept in mind that where other heat shrinkable tubing is expanded to a high degree such as a 2 to 1 expansion ratio and then shrunk, it has a tendency to split, which is not exhibited by heat shrinkable FEP 160 of the invention. This tendency to split at maximum expansion range is particularly pronounced in heat shrinkable tubing of irradiated polyolefin or Teflon TFE.

Likewise the tubing of the present invention will grip over wire harnesses, wire, cables, electrical connectors, and the like to adhere closely to both larger and smaller diameters within the ratio above referred to.

The contraction or shrinkage is uniform and unlike some of the products of the prior art does not involve shriveling of the tubing so that there is not any appreciable rejection rate from improperly heat shrunk tubing.

Since the heat shrunk tubing of the invention has not been irradiated it remains heat sealable.

Without limiting to the validity of the theory, it appears to be the fact that under conditions produced by melt extrusion and expansion according to the invention, the fluorine atom being relatively small compared to other atoms which are substituted for hydrogen, produces a sheath whose cohesive energy density to adjoining molecule chains is relatively great. Thus crystallites are formed which resemble those of FEP fluorocarbon resin and the tubing has a greater elastic memory than can be effectively employed. The particular extrusion temperature used and rates tend to preserve the crystallites rather than break them up so that more of the elastic memory inherent in FEP 160 fluorocarbon resin can be used to make the heat shrinkable tubing.

The FEP 160 fluorocarbon is transparent before expansion, when expanded and after heat shrinking, and this is a great benefit in inspection of wiring and the like. It has the fire resistance, resistance to chemical attack and insulating properties which are characteristic of FEP 100 fluorocarbon.

The tubing of the invention has the low coefficient of friction and slipperiness characteristic of FEP 100 fluorocarbon.

One important use of the tubing of the invention is in providing corrosion protecting coverings on rolls, shafts and other equipment subjected to chemical attack.

The resistance to stress cracking of the tubing of the invention is outstanding.

FIGURE 6 plots as ordinate the percent of total shrinkage possible against the temperature of heat shrinking in degrees F. as abscissa, for various plastic tubings.

As a basis for comparison, curve A shows a plot for irradiated polyolefin heat shrinkable tubing. This shows a rather steep curve with a narrow temperature range over which the various possible shrinkages can be obtained. For example, a temperature of about 225° F. will give 50% shrinkage and a temperature of about 275° F. will give 100% shrinkage.

Curve B for FEP 100 heat shrinkage tubing is considerably flatter. This shows that heating this tubing to a temperature of about 300° F. will give a shrinkage of about 65% and heating to a temperature of about 375° F. will give 100% shrinkage.

Curve C for FEP 160 tubing produced according to the present invention, is remarkably different. This shows that this heat shrinkable tubing begins to shrink by heating to a relatively low temperature, of the order of 200° or below, but that to get 100% of the total shrinkage available one must heat it to about 480° F. 50% of the total shrinkage is obtained by heating to about 340° F. This much flatter curve of heat shrinking temperature is an unusual aspect of the tubing of the present invention.

Another unusual aspect of the tubing of the invention is that when it is being expanded at a suitable expanding temperature under a suitable internal pressure, the tubing of the invention if not restrained by a surrounding mandrel will simply blow up and burst, but by surrounding it by a proper mandrel which will confine it at the proper expanded diameter and then cooling it while still at that expanded diameter, the unusual properties of the invention can be obtained.

Thus in a particular case in expanding FEP 160 fluorocarbon according to the invention, having an extruded internal diameter of 3/16 inch and a wall thickness of 0.020 inch, the tubing while inside the mandrel was heated to a temperature of 350° F. and an internal air pressure of 100 p.s.i. was applied. The tubing expanded to fit the mandrel whether the mandrel had a size which corresponded to a ratio of expanded diameter to recovered diameter of 2.05, 2.50 or any range in between, thus making possible these unusual ratios which were not previously obtainable. On the other hand, if the mandrel was not present or was substantially larger in diameter, the tubing under the same conditions of temperature and internal pressure continued to expand and burst. Accordingly, in the present invention unusual importance must be attached to the proper predetermining of the mandrel diameter for the particular initial size of tubing.

In view of our invention and disclosure variations and modifications to meet individual whim or particular need will doubtless become evident to others skilled in the art, to obtain all or part of the benefits of our invention without copying the process and product shown, and we therefore claim all such insofar as they fall within the reasonable spirit and scope of our invention.

Having thus described our invention what we claim as new and desire to secure by Letters Patent is:

1. Heat shrinkable tubing of FEP 160 fluorocarbon which is a copolymer of tetrafluoroethylene and 5 to 50% of hexafluoropropylene, having a tensile strength between 4000 and 4500 p.s.i., whose ratio of expanded diameter to recovered diameter varies between 2.05 and 2.50 and retaining the properties of heat sealability.

2. Heat shrinkage tubing of claim 1, in which the proportion of hexafluoropropylene is between 5 and 15%.

3. Heat shrinkable tubing of FEP 160 fluorocarbon which is a copolymer of tetrafluoroethylene and 5 to 50% of hexafluoropropylene whose ratio of expanded diameter to recovered diameter varies between 2.05 and 2.50, said tubing being in continuous lengths of 10 feet or greater.

4. Heat shrinkable tubing of FEP 160 fluorocarbon which is a copolymer of tetrafluoroethylene and 5 to 50% by weight of hexafluoropropylene, having a tensile strength between 4000 and 4500 p.s.i., whose ratio of expanded diameter to recovered diameter varies between 2.05 and 2.50 and having a wall thickness of between 0.015 and 0.060 inch.

References Cited

UNITED STATES PATENTS

| | | | |
|---|---|---|---|
| 3,196,194 | 7/1965 | Ely et al. | 138—118 X |
| 3,265,092 | 8/1966 | Ely et al. | 138—118 |

HERBERT F. ROSS, Primary Examiner

U.S. Cl. X.R.

138—118; 264—98

PO-1050
(5/69)

UNITED STATES PATENT OFFICE
CERTIFICATE OF CORRECTION

Patent No. 3,500,870           Dated March 17, 1970

Inventor(s) Berten E. Ely, Jr. and Ira T. Clement

It is certified that error appears in the above-identified patent and that said Letters Patent are hereby corrected as shown below:

Column 3, line 27, "latex" should read - later - .

SIGNED AND
SEALED
NOV 17 1970

(SEAL)
Attest:

Edward M. Fletcher, Jr.
Attesting Officer

WILLIAM E. SCHUYLER, JR.
Commissioner of Patents